US006415771B1

(12) United States Patent
Mihatsch et al.

(10) Patent No.: US 6,415,771 B1
(45) Date of Patent: Jul. 9, 2002

(54) DEVICE FOR CONVEYING FUEL FROM A TANK TO THE INTERNAL COMBUSTION ENGINE OF A MOTOR VEHICLE

(75) Inventors: Steffen Mihatsch, Ludwigsburg; Willi Strohl, Beilstein; Erich Eiler, Sersheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,652

(22) PCT Filed: Dec. 16, 1998

(86) PCT No.: PCT/DE98/03700

§ 371 (c)(1), (2), (4) Date: Mar. 2, 2001

(87) PCT Pub. No.: WO99/65720

PCT Pub. Date: Dec. 23, 1999

(30) Foreign Application Priority Data

Jun. 18, 1998 (DE) ........................................ 198 27 060

(51) Int. Cl.[7] ........................ F02M 37/02; B60K 15/077

(52) U.S. Cl. ........................ 123/514; 137/574; 137/576

(58) Field of Search ................................ 123/510, 511, 123/514; 137/571, 574, 576; 417/76, 87

(56) References Cited

U.S. PATENT DOCUMENTS 4,503,885 A 3/1985 Hall ........................... 137/574
5,197,444 A * 3/1993 Lang et al. ................. 123/514

FOREIGN PATENT DOCUMENTS

| | | |
|---|---|---|
| DE | 91 01 313.5 | 6/1991 |
| EP | 0 717 197 A | 6/1996 |
| EP | 0 819 843 A | 1/1998 |
| GB | 2 207 952 A | 2/1989 |

* cited by examiner

*Primary Examiner*—Tony M. Argenbright
(74) *Attorney, Agent, or Firm*—Michael J. Striker

(57) ABSTRACT

An apparatus for pumping fuel from a tank (10) to the internal combustion engine (12) of a vehicle has a jet pump (24), which supplies fuel returning from the internal combustion engine (12) in a return line (22) together with fuel disposed in the tank (10) into a storage reservoir (14) of a fuel delivery unit (16). The invention proposes embodying a restriction (23) for the fuel between a seat edge (31) and a spring-loaded ball (32). In addition, inlet openings (39) for the fuel disposed in the tank (10) are embodied in the vicinity of the restriction (23). The apparatus has the advantage of a high delivery output, a compact design, and a delivery onset even when there are relatively low return quantities. Furthermore, fuel is prevented from flowing back into the return line (22).

6 Claims, 1 Drawing Sheet

Figure 1:
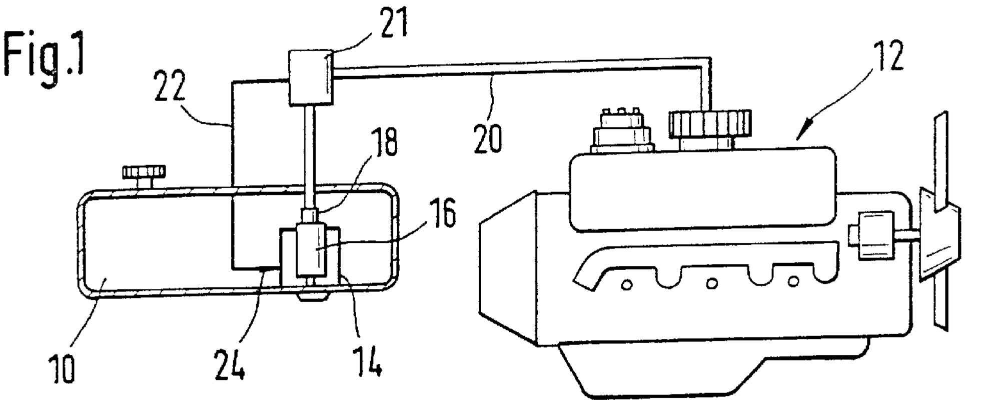

DEVICE FOR CONVEYING FUEL FROM A TANK TO THE INTERNAL COMBUSTION ENGINE OF A MOTOR VEHICLE

PRIOR ART

The invention relates to an apparatus for pumping fuel from a tank to the internal combustion engine of a vehicle, as is known from the German Utility Model DE-GM 91 01 313. The known apparatus has a compression spring-loaded nozzle-shaped body that opens an additional flow cross section starting at a particular pressure in the return line from the internal combustion engine in order to reduce the delivery output of the jet pump. Since the nozzle-shaped body, because it opens in both directions, can be continuously flowed through, it is possible for fuel to flow back into the return line.

Furthermore, U.S. Pat. No. 4,503,885 has disclosed using a ball which functions as a check valve in the return line and is acted on by spring force. Since the ball is disposed in an additional space, the known jet pump is relatively large in size.

ADVANTAGES OF THE INVENTION

The apparatus according to the invention for pumping fuel from a tank to the internal combustion engine of a vehicle has the advantage over the prior art that with a compact construction, it prevents a return flow of fuel into the return line and at the same time regulates the pressure in the return line. As a result, the jet pump begins to deliver fuel at very low return quantities. At the same time, the through flow cross section at the closing member, which depends on the return quantity in the return line, produces a delivery quantity of the jet pump which depends on the return quantity.

Additional advantages and advantageous improvements of the apparatus according to the invention for pumping fuel from a tank to the internal combustion engine of a vehicle ensue from the dependent claims and the specification.

It is particularly advantageous if the spring loading the closing member is designed in such a way that the closing member lifts off from its sealing seat only when the system pressure for the engine has been reached. This permits the elimination of the pressure regulator normally required in the system of the internal combustion engine.

DRAWINGS

An exemplary embodiment of the invention is depicted in the drawings and will be explained in detail below.

Figure 2:
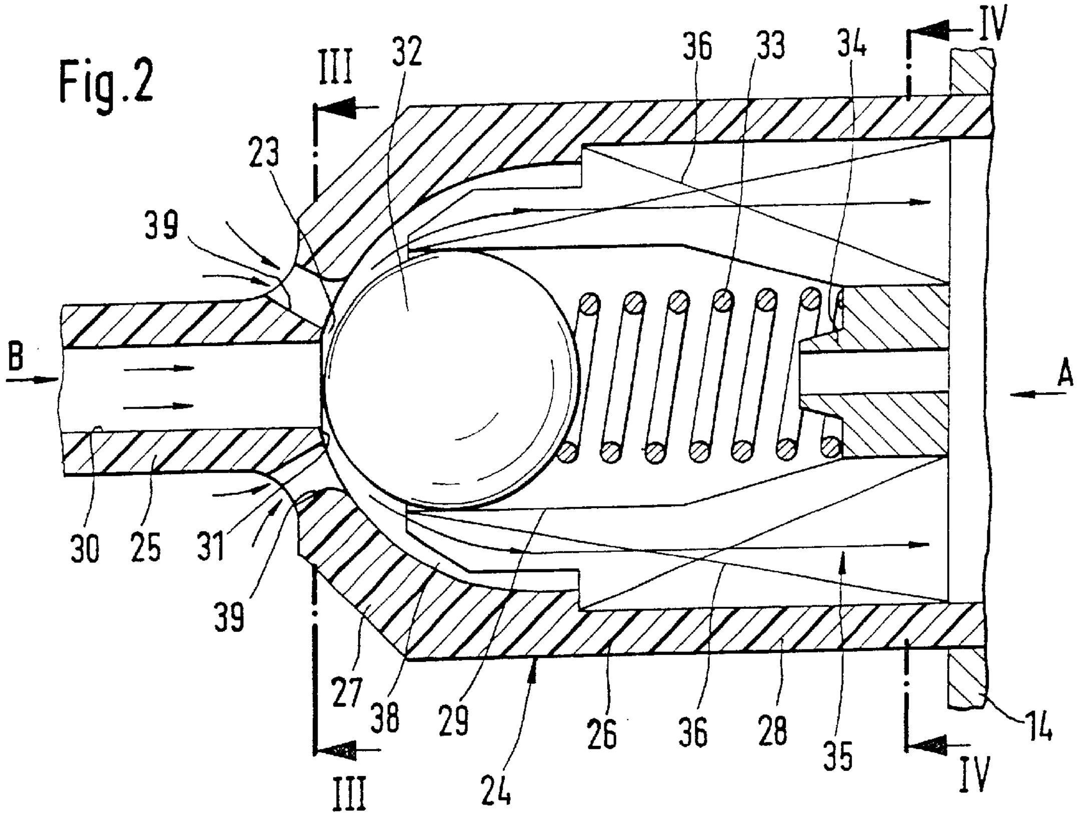
Figure 3:
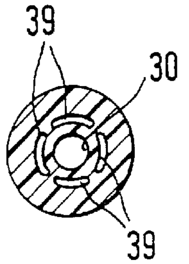
Figure 4:
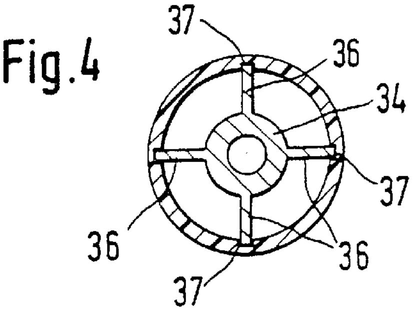

FIG. 1 is a simplified depiction of an apparatus for pumping fuel from a tank to the internal combustion engine of a vehicle, FIG. 2 is a longitudinal section through the jet pump of the apparatus according to FIG. 1, and FIGS. 3 & 4 show sections along the lines III—III and IV—IV in FIG. 2.

DESCRIPTION OF EXEMPLARY EMBODIMENT

FIG. 1 is a simplified depiction of an apparatus which is used for pumping fuel from a tank 10 to the internal combustion engine 12 of a vehicle. The tank 10 contains a storage reservoir 14 aspirated by a fuel delivery unit 16, which is disposed in the storage reservoir 14. A pressure line 20 which leads to the internal combustion engine 12 is connected to a pressure fitting 18 of the fuel delivery unit 16.

The pressure line 20 also contains a pressure regulator 21 which regulates the pressure of the supplied fuel in the pressure line 20 to the system pressure appropriate for the internal combustion engine 12. A return line 22 leads from the pressure regulator 21 back to the tank 10 and the fuel not required by the internal combustion engine 12 flows back into the tank 10 through this return line.

The return line 22 is connected to a jet pump 24, which is disposed inside the tank 10 and pumps fuel into the storage reservoir 14. During operation of the internal combustion engine 12, the fuel delivery unit 16 supplies fuel from the storage reservoir 14 to the internal combustion engine 12 and the fuel flowing back through the return line 22 propels the jet pump 24.

The jet pump 24 shown in detail in FIG. 2, which is inserted into an opening formed in the wall of the storage reservoir 14, has an inlet fitting 25 connected to the return line 22. The inlet fitting 25 is part of a housing 26 of the jet pump 24, which is preferably comprised of plastic or metal. The hollow, cylindrical housing 26 widens out from the inlet fitting 25 via a conical section 27 to a region 28 whose diameter is enlarged in relation to the inlet fitting 25. The inner surface of the inner chamber 29 of the housing 26 in the vicinity of the section 27 is embodied in such a way that the cross section widens in the flow direction and in the transition region from the cylindrical inlet conduit 30 to the section 27, a seat edge 31 is formed, which constitutes a sealing seat together with a ball 32 that functions as a closing member. When the ball 32 lifts off from the seat edge 31, an annular gap 23 is embodied between the seat edge 31 and the ball 32; this gap acts as a cross-sectional restriction for the fuel flowing through the inlet conduit 30.

The ball 32 is loaded in the direction of the seat edge 31 by the spring force of a spring 33. On the end remote from the ball 32, the spring 33 is supported against the end 34 of a guide body 35.

The guide body 35 has four guide ribs 36, which are disposed offset from one another by 90° and which, in order to fasten the guide body 35 in the housing 26, positively engage in a form-fitting manner in corresponding recesses 37 that are embodied in the wall surface of the region 28. The guide ribs 36 assure that the ball 32 is axially guided when it lifts off from the seat edge 31. Particularly in the section 27, gaps 38 are produced between the guide ribs 36 and the wall of the section 27.

Furthermore, four slot-shaped inlet openings 39 disposed in a common circle segment are embodied in the section 27, which connect the tank 10 and the inner chamber 29 of the jet pump 24 to each other. The inlet openings 39 feed into the inner chamber 29 in the immediate vicinity of the seat edge 31 and the ball 32 when the ball is resting against the seat edge 31. In this position of the ball 32, the inlet openings 39 are aimed approximately at the center point of the ball 32.

During operation of the internal combustion engine 12, excess fuel travels from the pressure regulator 21 into the return line 22 and from there, into the inlet fitting 25. As soon as the pressure has exceeded a pressure predetermined by the spring 33, the ball 32 lifts off from the seat edge 31. As a result, the fuel flows around the ball 32 with an increase in its flow speed. In the course of this, the fuel disposed in the inlet openings 39 is carried along and mixes with the fuel that has come in through the inlet fitting 25. This mixing process occurs essentially in the section 27 before the guide ribs 36 and in the vicinity of the gap 38. The fuel that is mixed in this manner travels via the region 28 of the housing 26 into the storage reservoir 14 in order to assure the required minimum fuel level required for the proper operation of the fuel delivery unit.

Furthermore, the above-described embodiment of the jet pump 24 assures that a relatively low return volume flow is sufficient to supply additional fuel through the inlet openings 39.

After the internal combustion engine 12 is shut down, as soon as the pressure of the fuel prevailing in the return line 22 drops to the point that the spring 33 pushes the ball 32 against the seat edge 31, the fuel is reliably prevented from flowing out of the tank 10 or the storage reservoir 14 and back into the return line 22.

In a modification of the above-described exemplary embodiment, it is also conceivable to eliminate the pressure regulator 21. In this instance, instead of the pressure regulator 21, the pressure line 20 is merely provided with a T-shaped distributing piece, which feeds the fuel supplied by the fuel delivery unit 16 back to the internal combustion engine 12 on the one hand and back to the jet pump 24 on the other. It is essential here that the spring 33 is now designed in such a way that it regulates the pressure in the pressure line 20 to the level required for the internal combustion engine 12. This also means that the ball 32 only lifts off from the seat edge 31 when the system pressure has been exceeded.

What is claimed is:

1. An apparatus for pumping fuel from a tank (10) to the internal combustion engine (12) of a vehicle, having a storage reservoir (14) contained in the tank (10), a fuel delivery unit (16) which is connected to the pressure side of the internal combustion engine (12) and aspirates from the storage reservoir (14), a return line (22) from the internal combustion engine (12) to the tank (10), a jet pump (24) disposed inside the tank (10) and connected to the return line (22), which pumps fuel into the storage reservoir (14), wherein the jet pump (24) has a restriction (23) for the fuel flowing back in the return line (22) in order to supply fuel from the tank (10) into the housing (26) via at least one inlet opening (39) embodied on the housing (26) of the jet pump (24), characterized in that the restriction (23) is embodied between a seat edge (31) and a closing element (32) loaded by a spring (33) so that the size of the restriction (23) can change as a function of the return quantity in the return line (22) and that the at least one inlet opening (39) is embodied in the vicinity of the restriction (23).

2. The apparatus according to claim 1, characterized in that the spring (33) is adapted to the system pressure for the internal combustion engine (12) so that fuel flows through the restriction (23) when the system pressure has been exceeded.

3. The apparatus according to claim 1, characterized in that a pressure regulator (21) is connected between the fuel delivery unit (16) and the internal combustion engine (12).

4. The apparatus according to claim 1, characterized in that the closing element is embodied as a ball (32) and that guides (36) for the ball (32) are disposed along the movement path of the ball (32).

5. The apparatus according to claim 4, characterized in that the guides (36) are embodied as a one-piece component (35) together with a spring support (34).

6. The apparatus according to claim 1, characterized in that a number of inlet openings (39) are embodied on the circumference of a transition region (27) of the housing (26) of the jet pump (24).

* * * * *